(12) United States Patent
Ford et al.

(10) Patent No.: US 8,411,089 B2
(45) Date of Patent: Apr. 2, 2013

(54) COMPUTER GRAPHICS METHOD FOR CREATING DIFFERING FOG EFFECTS IN LIGHTED AND SHADOWED AREAS

(75) Inventors: Adam William Ford, Eagle Mountain, UT (US); John-Paul Ownby, South Jordan, UT (US)

(73) Assignee: Disney Enterprises, Inc., Burbank, CA (US)

( * ) Notice: Subject to any disclaimer, the term of this patent is extended or adjusted under 35 U.S.C. 154(b) by 918 days.

(21) Appl. No.: 12/509,987

(22) Filed: Jul. 27, 2009

(65) Prior Publication Data
US 2011/0018890 A1    Jan. 27, 2011

(51) Int. Cl.
*G06T 15/50* (2006.01)
(52) U.S. Cl. .................... 345/426; 345/589; 345/592
(58) Field of Classification Search .................. None
See application file for complete search history.

(56) References Cited

U.S. PATENT DOCUMENTS

| | | | |
|---|---|---|---|
| 6,064,392 A * | 5/2000 | Rohner | 345/426 |
| 6,580,430 B1 | 6/2003 | Hollis et al. | |
| 6,762,760 B2 | 7/2004 | Deering | |
| 7,245,301 B2 | 7/2007 | Mech | |
| 7,248,260 B2 * | 7/2007 | Yamaguchi | 345/426 |
| 7,301,546 B2 | 11/2007 | Cosman et al. | |

OTHER PUBLICATIONS

R. Victor Klassen, "Modeling the Effect of the Atmosphere on Light", Jul. 1987, Journal of ACM Transactions on Graphics, vol. 6, Issue 3, pp. 215-237.*
W. Heidrich, R. Westermann, H. Seidel, T. Ertl, "Applications of Pixel Textures in Visualization and Realistic Image Synthesis", Apr. 29, 1999, I3D '99 Proceedings of the 1999 Symposium on Interactive 3D Graphics, pp. 127-134.*
Rogers, Douglas, "Implementing Fog in Direct3D" Last updated Jan. 2000, NVIDIA Corporation.
Fog (Direct3D 9), Pixel Fog (Direct 3D9), and Vertex Fog (Direct3D 9), http://msdn.microsoft.com/en-us/library/bb173398(VS. 85,printer).aspx, retrieved May 19, 2009.
Science Daily, A Better Fog and Smoke Machine From Computer Scientists, http://www.sciencedaily.com/releases/2008/04/080415185011.htm, retrieved May 19, 2009.
Zhou, Kun, et al., "Fogshop: Real-Time Design and Rendering of Inhomogeneous, Single-Scattering Media" Mar. 2007, Microsoft Research Asia.

* cited by examiner

*Primary Examiner* — Ulka Chauhan
*Assistant Examiner* — Robert Bader
(74) *Attorney, Agent, or Firm* — Marsh Fischmann & Breyfogle, LLP; Kent A. Lembke (57) ABSTRACT

A method for providing fog or fading due to atmospheric effects during computer animation of an image. The method includes determining a lighting value for a scene's or an image's pixels based on the positions of the pixels relative to a light source. The method includes, for each of the pixels, setting a fade in start distance for each pixel measured from a camera location so as to define when fog is added, e.g., when to fade a pixel's color by blending this color with a fog color. The fade in start distances are set based on each pixel's lighting value, whereby pixels with smaller lighting values or shadowed pixels begin to fade first while highlighted pixels fade with greater distances. The method includes adding fog to the image starting at the fade in start distances for each of the pixels and then rendering the image.

20 Claims, 9 Drawing Sheets

COMPUTER GRAPHICS METHOD FOR CREATING DIFFERING FOG EFFECTS IN LIGHTED AND SHADOWED AREAS

BACKGROUND

1. Field of the Invention

The present invention relates, in general, to computer graphics such as graphics systems, hardware, and software used for image generation including interactive and/or frequently changing/update image generation for video games and other applications, and, more particularly, to computer graphics systems and methods for use in interactive video games and other applications that provide improved fog effects.

2. Relevant Background

Recently, the video game industry has been enjoying tremendous growth with increasing demand for video games with visually appealing, captivating, and artistic animation. Video games are widely played using video game systems and a monitor such as television and using a computer and its hardware and monitor such as to play multi-player online or Web-based games. More recently, video games and similar applications have been provided in many more setting such as in vehicles and on handheld/portable electronic devices such as cellphones, handheld gaming devices, personal digital assistants. It is expected that the demand for video games with desirable animation will only continue to grow in the coming years.

Computer graphics systems are used in many video games and other animation applications to render animation in a responsive or interactive manner. Graphics system designers generally attempt to provide realism or some artistic quality in their graphics systems by closely modeling a three dimensional (3D) virtual world based on the real world. For example, graphics systems allow game designers to place 3D objects such as mountains, houses, characters, animals, and so on in a scene that is to be animated during game play. Interfaces also allow the game designers and animators to select colors for each of these 3D objects and even for each pixel within the animated object. Further, the animator may select where to place a light source, such as the Sun, within the animated scene and select a location of a camera (or eye-coordinate) to set a point of view for the scene. As a result, the animator is able to create a scene with carefully colored/painted objects that are highlighted in a desired manner with lighting and shadows, and the scene is viewed from a location chosen by the game designer (or that changes as the player moves a character and with them a camera or eye-coordinate).

In the real world, object become more difficult to see with distance due to atmospheric effects, and, if these effects are not taken into account, computer-generated images have a distinctive, clear quality that is unrealistic. To address this difference between the real world and animated worlds, graphics systems are used to change clarity of the images due to atmospheric effects such as fog, smog, mist, smoke, pollution and the like, with all of these effects generally lumped together and called "fog" or a "fog effect" in computer graphics. Adding fog to a 3D scene can enhance realism, provide ambiance, and obscure artifacts sometimes caused when distant geometry comes into view.

Various mechanisms have been used in graphics systems to simulate fog or provide a fog effect. Essentially, fog is implemented by blending the color of objects in a scene with a chosen fog color based on the depth of an object in a scene or its distance from the viewpoint or camera. As objects grow more distant, their original color blends more and more with the artist/designer-selected fog color. This blending of the two colors creates the illusion (typically, on a pixel by pixel basis) that the object is being increasingly obscured by fog or other atmospheric effects present in the scene or simply based on distance as is the case in the real world. For example, gray may be chosen for the fog color and a pixel within an object may have a yellow color. As the object's pixel becomes more and more distant from the camera or viewpoint (e.g., location of a video game character) the amount or percentage of gray is increased until the pixel is rendered using only gray, which causes the pixel to fade out of view in the animation.

Hence, the range-based fog effect method determines how far the viewer is from the object (e.g., determines a z value or distance from an eye or camera coordinate to an object) and, depending on this z value, blends the object to a certain degree with the color of the fog (e.g., averages the pixel's color with the predefined fog color). Thus, objects appear to fade away in fog the farther away they are from the viewer. The game designer or programmer also may specify, such as via a game interface or application programming interface (API), how much visibility drops off with distance, such as may be used to indicate a thickness or density of fog, smoke, or other atmospheric effect. The visibility drop off or fade value may be referred to as the "fog scale" herein and may be defined in a linear, an exponential, an exponential-squared, or other manner. While the fog scale can be used to define the effect as the viewer's distance changes, the fog itself typically has a uniform density or is homogeneous throughout the animated scene. However, four values generally are used to create existing fog effects, i.e., pixel color, fog color, a z value (or distance from camera/viewpoint), and a fog scale or blending factor.

The blending effect may be carried out in different ways such as using pixel fog (or table fog) or vertex fog. The blending effect under the pixel fog model is calculated on a per-pixel basis in the graphics system's device driver. The vertex fog model makes calculations in the pipeline when transformation and lighting calculations are performed. The vertex fog model calculates the blending for each vertex in a polygon and then interpolates the effect across the face of the polygon. One extension is layered fog. Layered fog utilizes a heterogeneous approach to fog density. Fog is created in layers, with each layer having its own density. This is a more costly processing approach, though, since calculations must be made for each layer, and these calculations must be blended together for a final result. This effect can most easily be pictured if the layers are arranged by decreasing density along the y axis, such that the fog is most dense near the ground. For example, a swamp where heavy fog is present on the ground and the fog dissipates the further up it moves. One important distinction is that fog can either be applied on a per pixel basis or on a per vertex basis and then interpolated to decide the values for each pixel. In each of these methodologies, the fog effect or amount of blending/fading is typically tied to the z value or distance from the viewpoint/camera, and pixels at a particular distance from the camera (or with a like z value) are generally treated identically throughout the animated image with application of an identical blending factor (or fog scale). For example, two trees on opposite sides of a mountain that are the same distance from a viewpoint/camera in a scene would have their pixels blended with a fog color in an identical manner.

SUMMARY OF THE DESCRIPTION

Traditionally, in games and other applications using computer-generated images or computer graphics, fog is introduced at a set distance from a camera or viewpoint with all aspects of the animation and/or generated image affected uniformly by the fog effect. Fog is used to more accurately introduce depth to an animated scene with more distant objects being less clear than nearer objects. It was recognized that fading or applying a fog effect solely on distance does not provide a true or accurate representation of what actually happens. In the real world, objects that are not as well lighted or are in shadow tend to have their details lost first or more quickly while the well lighted objects and their details (or highlights) tend to remain visible. For example, a faraway building may cast a relatively large shadow, and the portion of the building that is in the sunlight (or well lighted) likely will have many details or highlights readily visible while objects or details in the cast shadow may not be visible all or at least are more difficult to see (e.g., are effected more by fog or atmospheric effects).

It was determined that it may be desirable to provide a computer graphics system and fog effect method that better models this real world effect, and it was also recognized that there are artistic merits to such a shadow-first fog effect (or highlighted-last fog effect). A fog effect method and computer graphics system that implements such a method are provided that allows fog to be introduced so as to allow details to be lost first in shadowed areas or on shadowed objects (or areas with a lower "light value") while the details in lighted areas or highlights of non-shadowed objects are lost second/later and/or more slowly. This may be considered an artistic technique as it may differ somewhat from physical accuracy but provides a painting or illustrating technique that provides a way to capture a particular physical effect. In some embodiments, the shadow-first fog effect is applied uniformly to the animation (e.g., to replicate fading of an image with distance such as by use of blue or other background color for a fog color), while in other embodiments, the shadow-first fog effect is used to introduce a more localized fog effect as may occur with the addition of a cloud, ground fog, smoke, or the like.

Briefly, in some embodiments, a fog effect method is provided that includes inserting or adding a fade in (or fog effect) start point and a fade in end point for pixels based on their light value, and this fade in start point is nearer to the viewpoint (eye location-coordinate) or camera position than the fade in start point for a fully lit pixel (e.g., a pixel with a light value of 1 (or normal to a light source) may have a fade in start point of 10 distance units from the viewpoint while a pixel with a light value of 0 (or fully shadowed) may have a fade in start point of 5 distance units from the viewpoint). The fog effect may be applied using any of a number of conventional techniques starting at these differing start points and being completed at the same or, more typically, differing fade in end points. In one case, the fog effect is applied linearly between start and end points while in other embodiments other techniques or fog scales are used such as exponential, exponential squared, or the like. In some embodiments, the fog effect method also includes modifying the light or lighting value to account for shadowing by an object positioned between the light source and the surface or object containing a particular pixel. In such cases, for example, a pixel may have a lighting value of 0.8 (on a 0 to 1 scale) but a determination may be made that an object is blocking the light from the source that would result in the pixel having its lighting value reduced to zero (or to a value between 0 and the original value of 0.8) prior to performing the fog effect calculation.

The fog effect method may involve the following steps: finding a lighting value for each pixel, determining a distance from a camera for the pixel, determining a fade in start and a fade in end distance for the pixel based on its lighting value, retrieving a color of the pixel without fog and a fog color, performing a fog effect calculation to determine the contribution of each of the two colors for the fog to achieve a fog effect using the fade in range determined for the pixel, and then mixing or blending the two color contributions to determine what color to use in rendering the pixel. Such a process is performed for each pixel, and then animation or rendering of the image may proceed with the pixel color information from the fog effect method.

More particularly, a method is provided for creating fog or a fog effect during computer animation of an image. The method may be performed by a variety of software, firmware, and hardware components that may be generally thought of as a graphics system with one or more processors (such as CPUs, GPUs, and the like) that run or use fog effect modules or similar devices to perform the desired functions or steps of the method. The method may include determining a lighting value with a fog effect module for each pixel of an image that is to be animated, and the lighting values may be provided to the fog effect module by another component/software of the graphics system and is determined based on the location/orientation of the pixels relative to a light source placed in the image or scene by an animator. The method may further include, for each of the pixels, setting a fade in start distance that is measured from a camera or eye-coordinate location. The fade in start distance defines when fog is to be added (e.g., when to start to fade a pixel's color by blending this color with a fog color).

Significantly, the fade in start distances are selected or set based on the lighting values associated with each of the pixels, whereby pixels with smaller lighting values (e.g., shadowed pixels) begin to fade first while highlighted pixel and details of the image associated with such pixels fade second and/or more slowly. The method may then include adding fog to the image with the fog effect module (e.g., a pixel shader including such a module) starting at the fade in start distances for each of the pixels and then rendering the image using the fog-added or fog-faded pixels.

The setting of the fade in distances may include retrieving from memory a fade in start distance for pixels associated with a minimum lighting value and a fade in start distance for pixels associated with a maximum lighting value, and then the determined lighting value for each pixel is compared to these values (e.g., a pixel with a lighting value midway between the minimum and maximum may be assigned a fade in start distance that is midway between the two retrieved fade in start distances when a linear calculation/comparison is performed). The fade in start distance for pixels with a minimum lighting value may be less than the fade in start distance for pixels with a maximum lighting value (e.g., about one third to one half of the maximum lighting value fade in start distance or the like). The method may also include retrieving from memory fade in end distances for pixels with minimum and maximum lighting values, and then setting a fade in end distance based on these values and a comparison of a pixel's lighting value to the minimum and maximum values (e.g., in a linear comparison or calculation implementation, a lighting value for a pixel that is seventy-five percent of the maximum (assuming the minimum value is zero) may be assigned a fade in end distance that is seventy-five percent of the way or range between the end distances of the minimum and maximum lighting values).

The adding of the fog to the image may include blending a pixel color with a fog color based on the pixel's distance from the camera relative to the fade in start and end distances set for the pixel based on its lighting value, with the blending being performed using linear, exponential, exponential squared, or another fog adding technique. In some embodiments, the determining of the lighting value may include determining whether an object is blocking the light source, and, if so, a pixel's lighting value may be modified to account for the amount of light blocked by the object (e.g., if the pixel's lighting value is 0.8 on a 0 to 1.0 scale without the blocking object but 0.5 with the object between the light source and the pixel location the lighting value may be changed or set to 0.5 prior to setting the fade in start distance at which to begin blending the pixel color with the fog color).

DETAILED DESCRIPTION OF EMBODIMENTS

Briefly, embodiments of fog effect methods (or animation with such fog effects) and graphics systems for generating animation with improved or shadow-first fog effects are described in the following paragraphs. The fog effect methods and graphics systems are adapted to introduce fog such that it accounts for a pixel's location in a scene relative to one or more light sources (e.g., what is its light value) and, in some cases, such that it accounts for shadowing by objects. The fog effect methods allow an animator to set a first distance from a camera or viewpoint at which they wish a fog effect to be started for portions of the scene that are shadowed and a second distance (that is greater than the first) from the camera or viewpoint at which they wish the fog effect to be started for portions of the scene that are fully lighted (e.g., for surfaces normal to the light source). When the fog effect is then applied, details are retained in lighted or highlighted objects as compared with details in shadowed objects (e.g., a tree on a shadowed hillside may more quickly fade from view as compared to a rock on a sunny location even though the tree and rock are the same distance from the camera or viewpoint used during animation).

Figure 1:
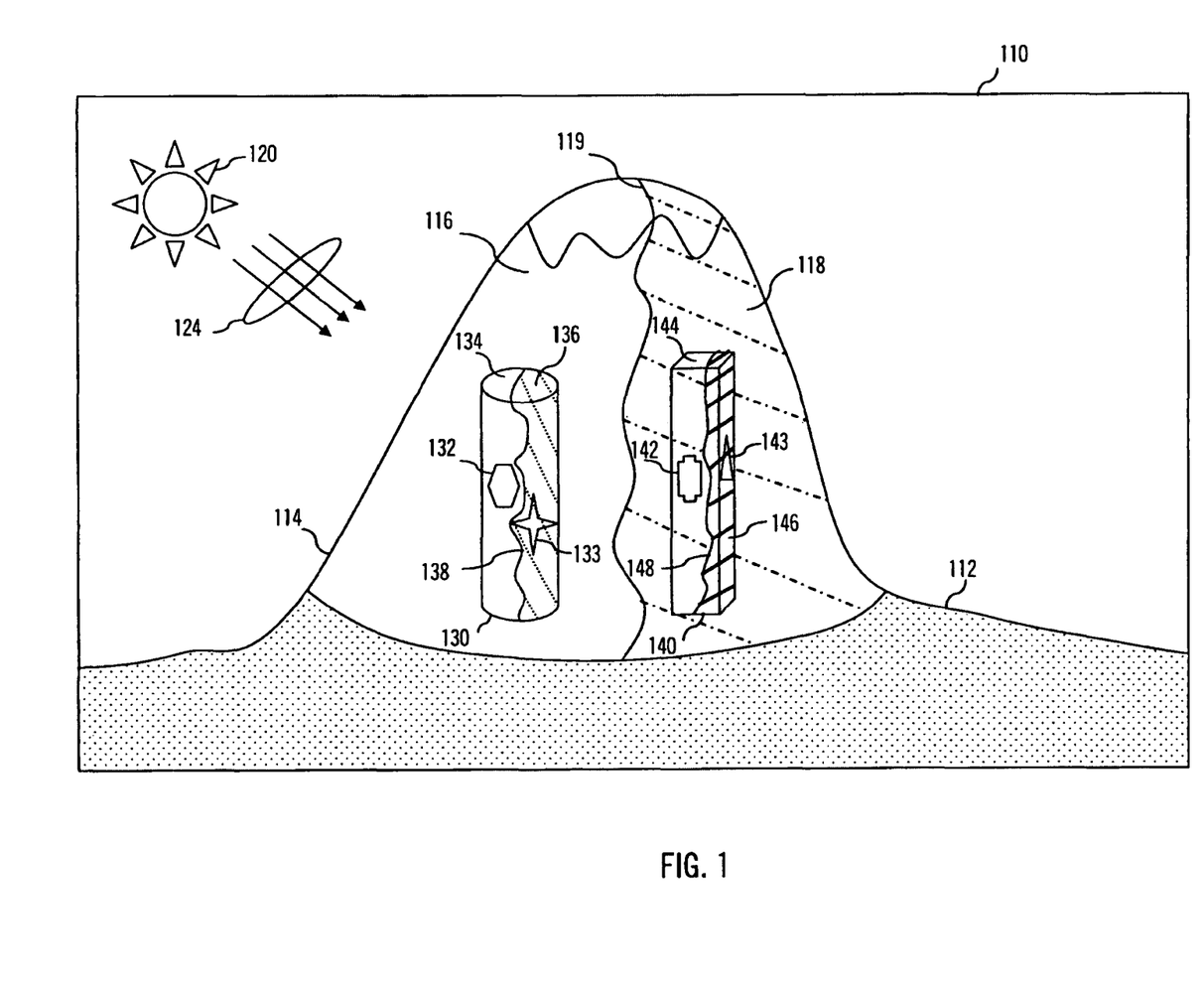
FIG. 1 illustrates an 3D image animated or rendered by a graphics systems as may be displayed on a monitor of a video game system or the like showing a simple scene with shadowing.
Figure 2:
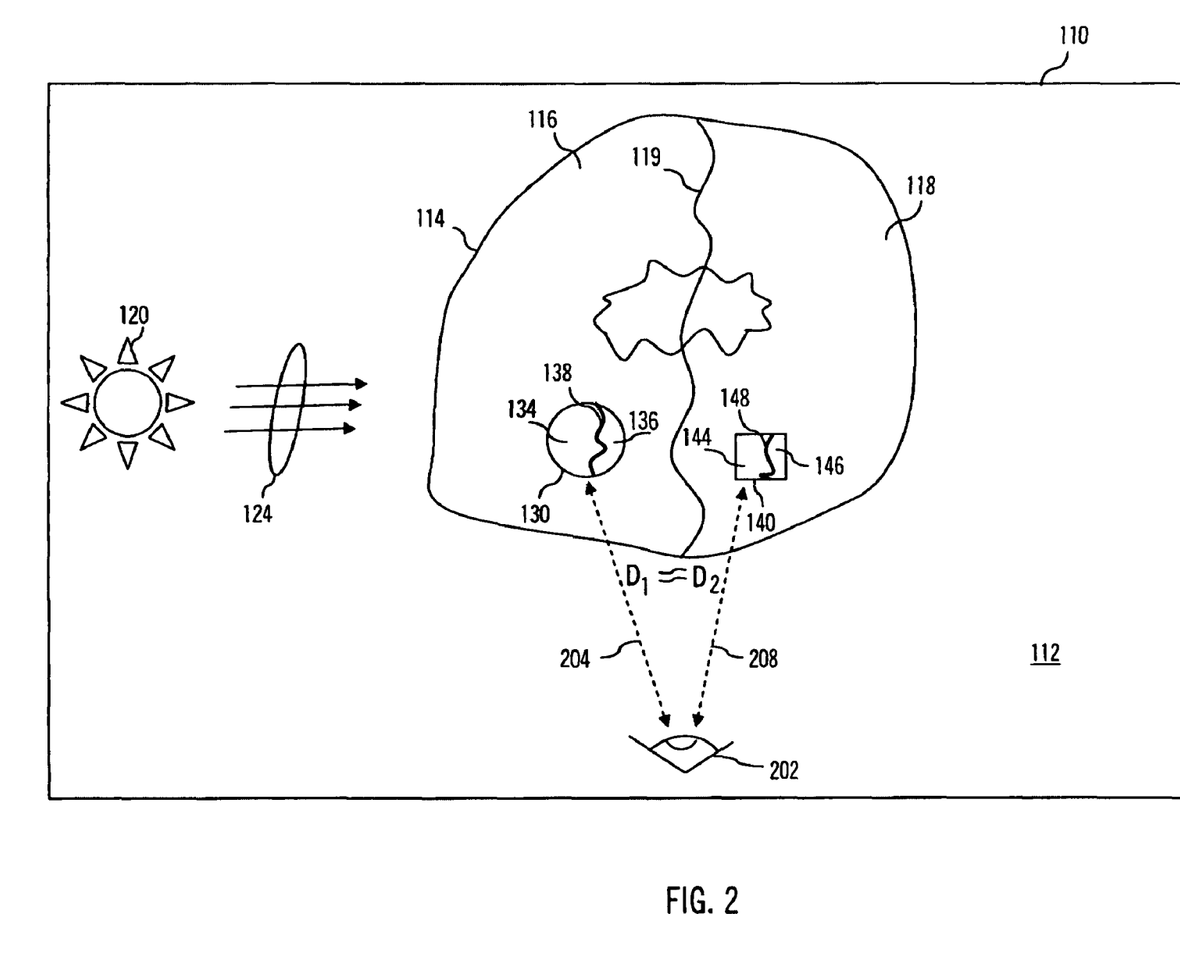
FIG. 2 illustrates a top view of the animated image or scene of FIG. 1 showing schematically a location of a camera or eye-coordinate showing that the two foreground figures or objects are approximately equidistant from the camera.

Prior to turning to the new fogging method with its differential treatment of pixels based on their lighting values, it may be useful to generally describe the problem context and prior fogging techniques. FIGS. 1 and 2 illustrate a relatively simple computer-generated image 110 as may be provided or rendered by operation of a computer such as via rendering software and/or by a graphics systems using hardware/software such as video graphics cards and/or graphics processing units (GPUs) with fog effect hardware/software (e.g., a fog effect module and supporting components such as distance or z value determination devices). The image 110 includes a number of 3D objects including a field 112 with a hill or mountain 114 protruding upward. A pair of foreground objects is provided on the hill 114 in the form of a circular cross-section column 130 extending upward from the hill 114 and in the form of square cross-section column 140.

As shown in FIG. 2, the animator or scene designer has positioned a camera or viewpoint (eye-coordinate) 202 at a foreground position, and the two columns 130, 140 as measured by lines 204, 208 are approximately the same distance from the camera 208. In other words, the z value or distance from the camera is considered equal for the following discussion for the two columns (with $d_1 = d_2$). The image 110 has also been provided with a light source 120 (shown as the Sun for simplicity's sake but often the source is not visible in an animated image and, similarly, the camera 202 is not shown in a displayed graphics image). The light source 120 provides light 124 that highlights or lights the objects in the image 110, and this lighting 124 and positioning of light source 120 also produces shadowing.

As shown, again in a rather simplified manner to ease explanation, the hill 114 may be thought of as having a fully lighted or highlighted side 116 and a shadowed or non-lighted side 118 that are divided roughly with line 119. In practice, there would likely be many gradations of lighting across the hill 114, but, for the purposes of this discussion, it is useful to discuss lighting more basically with the understanding that assignment of lighting values may be much more complex and may be implemented in any of various well-known ways presently used or developed later for computer animation.

Briefly, a lighting value may be assigned to each pixel in an image 110 based on the orientation and location of the pixel relative to one or more light sources 120. For example, a pixel may be determined to be normal or on a surface normal to the source 120, and this pixel may have a highest lighting value indicating it is fully lighted or highlighted such as, but not limited to, a lighting value of 1.0 on a 0 to 1.0 lighting value scale. Pixels on surfaces that are not normal to the light sources rays 124 will have a lighting value indicative of the degree of normalcy to the rays 124 ranging from 0 up to (but less than) 1.0 in this exemplary lighting value range.

Turning to FIG. 1, the highlighted side 116 of the hill 114 may be considered or determined (by the graphics system that produced the image 110) to have a maximum lighting value (such as 1.0). In contrast, the shaded or shadowed hillside 118 may be considered or determined to have a lighting value that is less such as 40 to 60 percent of the maximum or the like (such as 0.5). Now, foreground object or column 130 includes detail components/objects 132, 133, and a highlighted or lighted side 134 separated from a shadowed or non-highlighted side 133. Detail 132 is on the lighted side 134 while detail 133 is on the shadowed side 136. The column 130 is positioned on the lighted side 116 of the hill 114, and, hence, its lighted side 134 and detail 132 may have pixels with maximum lighting values (such as 1.0), but the shadowed side 136 and detail 133 may have pixels with a less than maximum values (such as about that of the shadowed hillside 118 or somewhat higher/brighter values such as 0.6 with a range or gradation typically occurring for the pixels on the side 136 from the line 138 to the farthest points on the column 130 from the line 138 and light source 120). The column 140 in contrast is positioned in a shadow on side 118. Hence, the column 140 may have a side 144 with detail 142 that have lighting values similar to that of the hillside 118 pixels (such as 0.5) while the side 146 with detail 143 and separated from lighted side 144 by line 148 (for simplicity sake in this drawing) would have pixels with lower or darker lighting values than the hillside 118 and those of column side 136 (so, a value of 0.2 may be appropriate such that detail 143 is faded or hazy in image 110 even prior to application of a fog effect).

Figure 3:
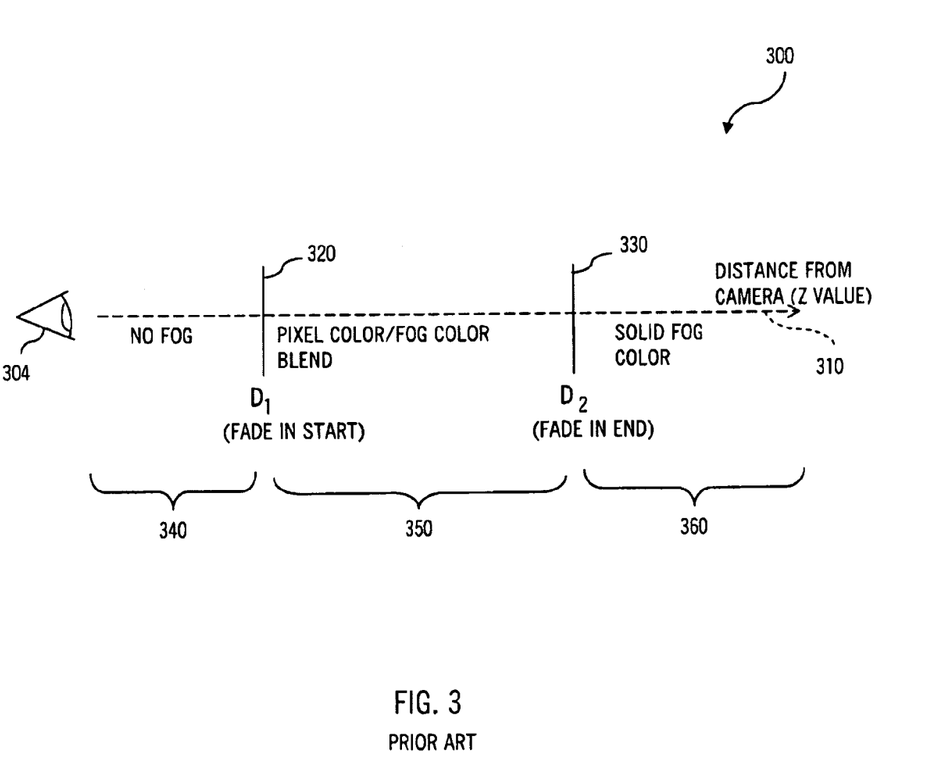
FIG. 3 shows schematically a prior art method of providing a fog effect in an animated image produced by a graphics system.

FIG. 3 illustrates with graph 300 a fog effect process that was provided in prior graphics systems relying on the distance from the camera or the z value to obtain a desired result. As shown, a camera or viewpoint 304 is provided in a scene to be animated and distance of pixels from the camera may be measured along line 310. An API may be presented to the animator or game designer to allow them to select when a fog effect should start and when the fog effect should be fully implemented (or full fog color applied to the pixel or blending should end). As shown, a start point or first distance, $d_1$, shown at 320 may be provided that indicates when fade in starts or fog effect starts and an end or second distance, $d_2$, shown at 330 may be provided or set by the animator that indicates to the graphics system when fade in ends or the fog effect is fully implemented (full fog color used for the pixel).

In use of such a fog effect technique or process in a graphics system, the graphics systems would process each pixel, prior to rendering a scene at a current time, to determine its current distance from the camera or viewpoint 304. If the distance is less than the first set distance, $d_1$, less than the fade in start distance, the pixel is in the region 340 (within a radius, $d_1$ from the camera) relative to the camera 304, and no fog is present or no effect is applied such that the graphics system determines and uses the pixel color (i.e., 100 percent pixel color with no blending). If the distance from the camera or z value is greater than the fade in end, $d_2$, or falls within the solid fog color region 360, the graphics system retrieves the fog color and uses this color for rendering the pixel (i.e., 100 percent fog color with no blending). However, when the graphics system determines that the distance from the camera or z value is between the first and second distances, $d_1$ and $d_2$ (or between fade in start and end points within the pixel color/fog color blend region 350), the graphics system uses the distance from the camera or z value to perform a fog effect calculation and mixes the contribution determined for the pixel color and for the fog color.

Regardless of the fog effect technique used, the blending is performed solely based upon the distance from the camera or z value. In other words, the blending or fog effect may be linear, exponential, exponential squared, or another blending method, but, in each case, the graphics system performs the blending determination based on the z value or distance and not based on the pixel's lighting value. For example, if the fog scale or blending factor is determined in a linear manner or with a linear blend and the distance from the camera is midway between points 320 and 330 (or halfway between fade in start and end), the graphics system may determine that each of the colors should contribute 50 percent to the blended color used for the pixel (e.g., the pixel color may be red and the fog color may be gray, and the blend would be 50 percent red and 50 percent gray at rendering of the pixel).

Figure 4:
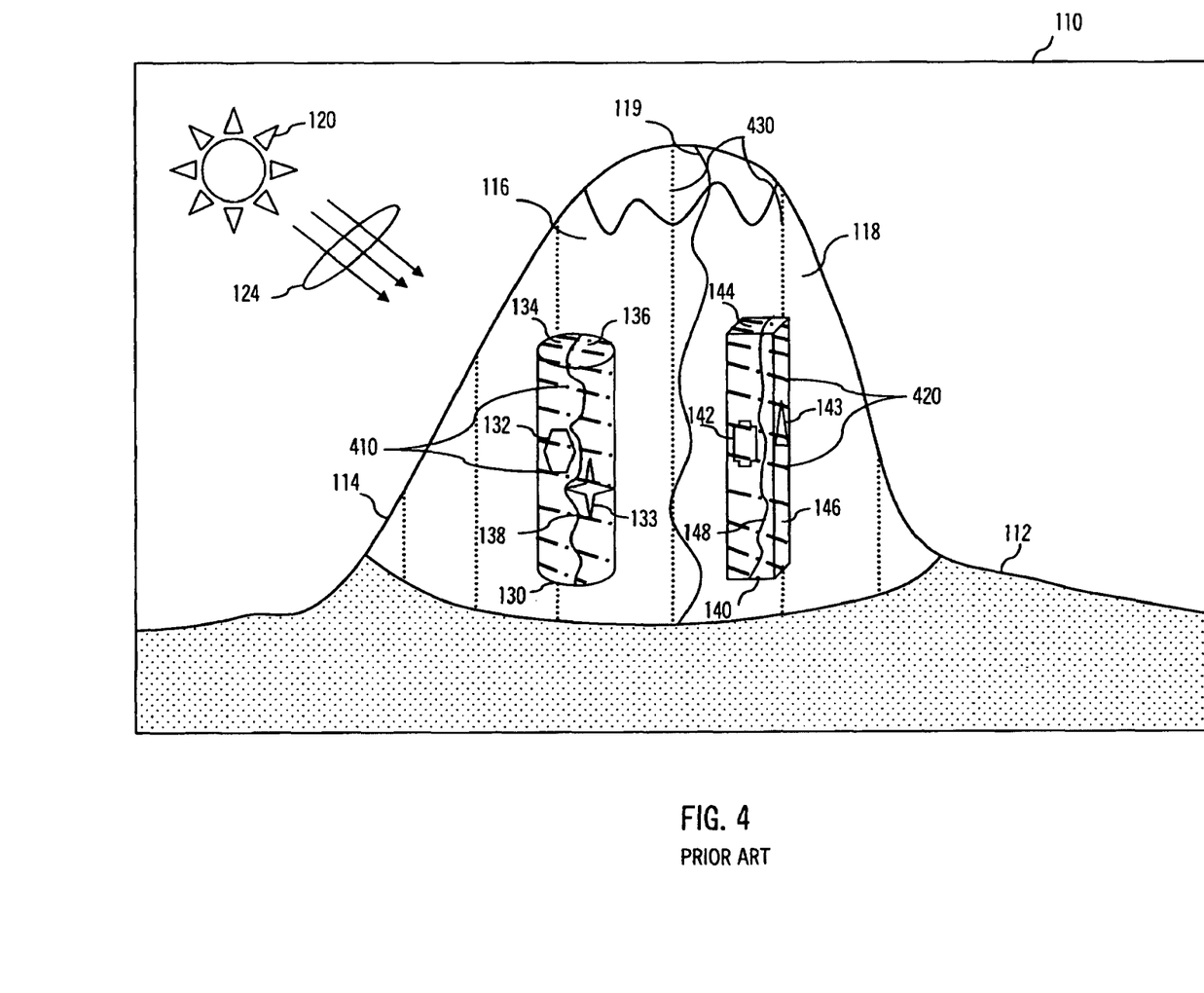
FIG. 4 illustrates the animated image of FIG. 1 after applying the fog effect method of FIG. 3 showing that the two foreground images are treated similarly for applying the fog effect, which is based solely on distance from a viewpoint or camera and which causes shaded areas or portions being treated similarly to lit or highlighted areas.

FIG. 4 illustrates the computer graphics image 110 as it may appear after application of the prior art fog effect method shown in FIG. 3. In this example, the hill 114 is generally considered to be a single distance from the camera, and, with this assumption, a single fog effect or color blending 430 is applied to all of the pixels on the hill 114. In other words, the pixels of the highlighted side 116 have the fog effect 430 applied in a similar manner as the pixels of the shadowed side 118 such that pixels with a lighting value of 1.0 and a lighting value of 0.5 (as provided in the original example of lighting values for FIGS. 1 and 2) would be blended in a similar manner. As a result, details in the lighted side 116 would fade just as quickly as on the darker or shadowed side 118, which may be undesirable to an artist creating an image with computer graphics. Similarly, the two columns or foreground objects 130, 140 would be treated identically for applying fog because they are the same distance from the camera in this example. Hence, the fog effect 410 applied to column 130, which is on the highlighted or lit side 114 and have higher lighting values, would be similar to the fog effect or blending 420 applied to column 140 and its pixels, which are on the shadowed side 118 and have lower lighting values. Likewise, the fog effects 410, 420 are applied identically to all pixels on the viewed surface of the columns (assuming these are equidistant from the camera in this example) even though sides 134, 144 have higher lighting values than sides 136, 146, which in the real world would likely cause details or highlights 132, 142 to remain more clear than details 133, 143 (which should fade first as is the case in the shadow-first fog effect described and claimed herein).

Figure 5:
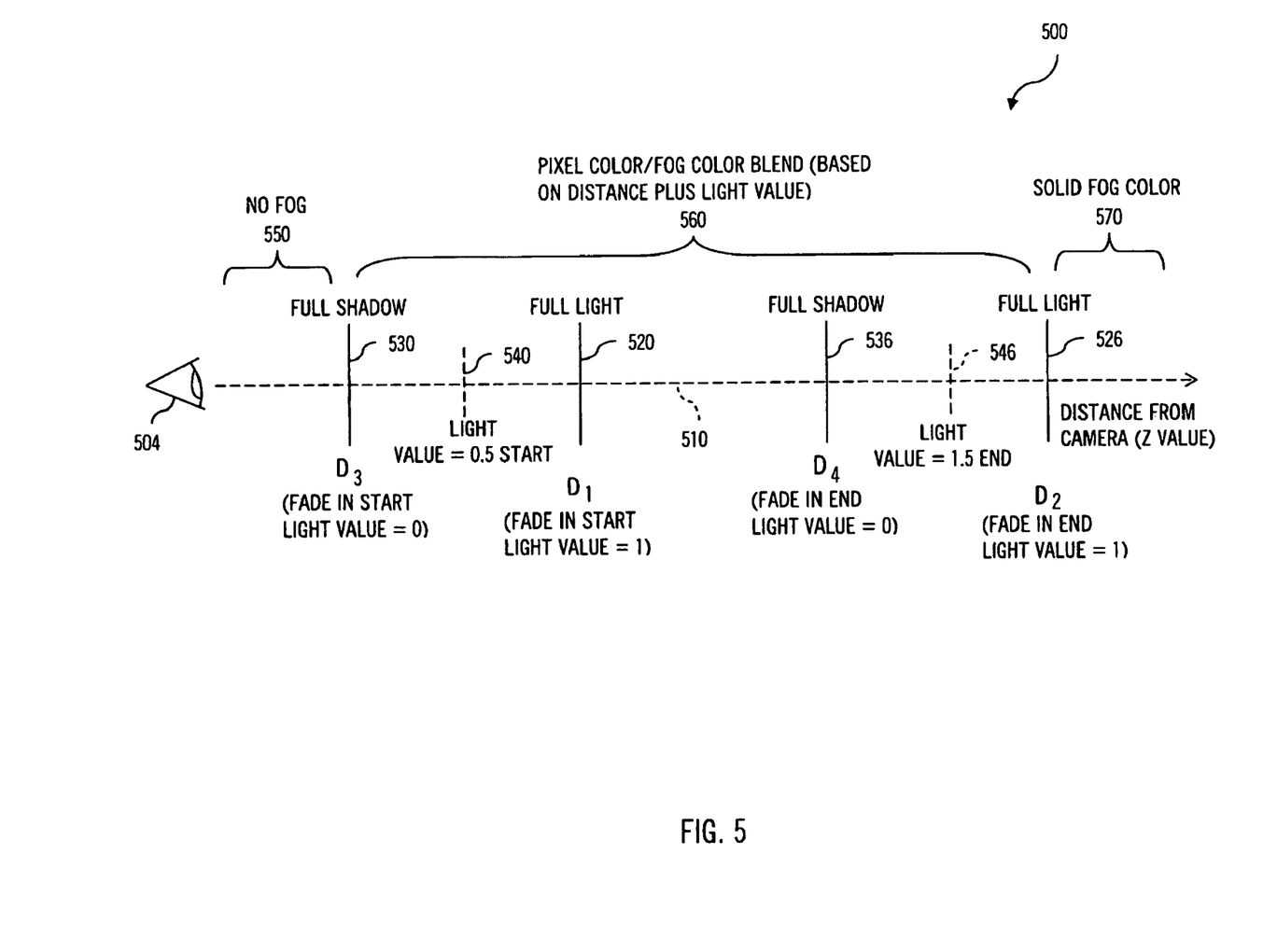
FIG. 5 shows schematically a method of providing a fog effect in an animated image produced by a graphics system according to one embodiment described herein.

FIG. 5 illustrates with graph 500 a fog effect according to an embodiment of this description that may be considered a shadow-first fog effect. Specifically, the method presented with graph 500 may be implemented by hardware/software provided in a graphics system (such as part of a GPU or the like) that acts to better model the real world by introducing fog earlier (and/or faster) in portions of an animated scene that have lower lighting values (or based upon a pixel's distance from the camera and also based upon the pixel's current/present lighting value, which may change over "time" within the animation such as based upon time of day or the like).

As shown, a camera or viewpoint position 504 is provided or defined for a scene to be animated, and distance from the camera (or a z value) is determined along a line between the camera 504 and a pixel of an object positioned within the scene. In use, an interface or API may be provided to an animator, game designer, or the like to allow them to set or define four distance values, $d_1$ to $d_4$, that are used to determine how to introduce fog into the scene, and, significantly, these values are based upon lighting values.

Specifically, a first distance, $d_1$, may be defined as shown at 520 along the distance from camera line 510 to define when an object (or pixel within such object) that is highlighted or normal to a light source or otherwise has a maximum or highest lighting value (e.g., 1.0 on a 0 to 1.0 scale or the like) should begin to have the fog effect applied (i.e., a fade in start value for maximum lighting values such as values of 1.0) during rendering of animated image by a graphics system. A second distance, $d_2$, may then be defined manually (such as by the designer moving a slide bar or entering a blending zone length) or automatically (such as by the fog effect module or API assuming a fixed blending zone as measured between distances $d_1$ and $d_2$ for highlighted pixels). During animation, the graphics system may determine a distance for a pixel that falls between the fade in start and fade in stop distances, $d_1$ and $d_2$, for fully lit pixels and determine that it has a lighting value of 1.0. In such a case, the pixel is in the blending or fog effect zone 560 in which the pixel is rendered using a blend of pixel color and fog color such as a linear, exponential, exponential-squared, or other method of blending based on the location of the pixel distance between first and second distances.

Likewise, the animator or other user of the fog effect method 500 may also set a third camera distance, $d_3$, that corresponds to a fade in start point or distance as shown at 530 for pixels determined to have a minimum lighting value (e.g., 0 on a 0 to 1.0 scale or the like). The third distance, $d_3$, is typically set within the graphics system (or its API or other software) to have a value that is equal to or, more preferably, at least some offset amount less than the first distance, $d_1$, such that fade in starts earlier (or at a smaller distance) for pixels with a minimum lighting value than pixels with a maximum lighting value (e.g., an offset of at least 0.5 to 2 distance units or the like). Hence, if a user indicates that the fade in start for full lighting, $d_1$, is equal to 30 distance units than the maximum setting of the fade in start for no lighting or full shadow, $d_3$, would be set programmatically (in many cases) to be 30 distance units or less some starting minimum offset value (e.g., to start it at 28 distance units or the like). A fourth distance setting, $d_4$, as shown at 536 is also set either manually within an API or the like by the user or by automatically/by default (e.g., a present blending zone length may be defined within the software) based upon the setting of the third distance, $d_3$. The fourth distance, $d_4$, defines where fade ends for pixels with minimum lighting values such that the pixel would be colored using the fog color (or no pixel color contribution in the blending).

Hence, as shown with graph 500, the fog effect method involves determining/retrieving a distance from the camera for a pixel and also determining/retrieving a lighting value for that pixel. Then, using this information, the fog calculation may be performed to determine the contribution of the color of the pixel and the color of the fog, and blending may be performed using a conventional technique such as linear blending or the like. Roughly, the fog effect graph 500 shows that there are three zones including a no fog zone 550 in which a pixel regardless of its lighting value will not experience a fog or fade effect, and this zone 550 is for camera distances or z values of less than the fade in start or third distance, $d_3$, set for lighting values of less than the minimum or typically a value of zero, and in this case, the pixel color would be used in rendering an animated image by the graphics system. Similarly, there is a solid fog color zone 570 used for all pixels that have a camera distance or z value that is greater than the second distance, $d_2$, or fade in end point set for pixels having a maximum or full lighting value (such as 1.0 on a 0 to 1.0 scale). In this zone 570, the pixel would be drawn or rendered using only the fog color (or 100 percent fog color contribution).

An intermediate zone 560 is provided between the fade in start point or distance, $d_3$, with minimum lighting values and the fade in end point or distance, $d_2$, for pixels with maximum lighting values. In this zone, the fog effect method involves determining not only the distance from the camera or z value for a pixel but also determining the pixel's lighting value as this second value will determine, at least in part, how the fog effect is applied. For example, a pixel may have a z value or viewpoint distance that is midway between the fade in start point, $d_3$, for minimum or no light and the fade in end point, $d_4$, for minimum or no light. If the pixel has a lighting value, however, that is a maximum value (such as 1.0), the z value or distance may be at or before the start point, $d_1$, for fade in for maximum light values, and, in such cases, no or little fog effect would occur. In contrast, if the pixel has a lighting value that is less than the maximum value, fog will be introduced. Particularly, the lighting value may be a minimum value (e.g., 0), and, in a linear blending factor application, the contribution of the pixel color and of the fog color may be set at 50 percent each.

In this manner, a pixel with a lighting value of less than the maximum may begin to experience some level of fading whenever its z value or viewpoint/camera distance is between the fade in start point for minimum lighting values and the fade in start point for maximum lighting values. For example, the graph 500 also shows a fade in start point 540 and end point 546 for pixels with a midpoint lighting value (such as 0.5 on a 0 to 1.0 scale), and fog would be applied at a distance less than for pixels with full lighting but after those pixels with minimum lighting values. The location of the start points (and end points) for fade in based on a lighting value between a minimum and maximum may be placed linearly between the start points (and end points) for fade in based on minimum or maximum (e.g., between distance $d_3$ and $d_1$ (and $d_4$ and $d_2$) in a linear manner or some other placement technique may be used (and such placement or setting may be performed manually by an artist/animator or automatically based on a calculation comparing the lighting value to the minimum and/or maximum). For example, a fifty-percent or midpoint lighting value may be placed midway between the two fade in start points/distances, $d_3$ and $d_1$, but this is not required.

Briefly, as distances for pixels from a camera are increased, the pixels with lower lighting values (or that receive less light from a source) will experience more of the fog effect as compared to pixels with higher lighting value such that lower lighting or shadowed pixels may fade from view while highlighted or well-lit pixels remain (e.g., highlighted details remain while shadowed details fade from the image or become fully the fog color). As graph 500 shows, for example, a pixel with minimum lighting will be rendered fully with the fog color at the fade in end point, $d_4$, whereas a pixel with maximum lighting will remain at least partially visible or colored at least in part with the no-fog pixel color up to fade in end point, $d_2$, which is greater than point, $d_4$.

Figure 6:
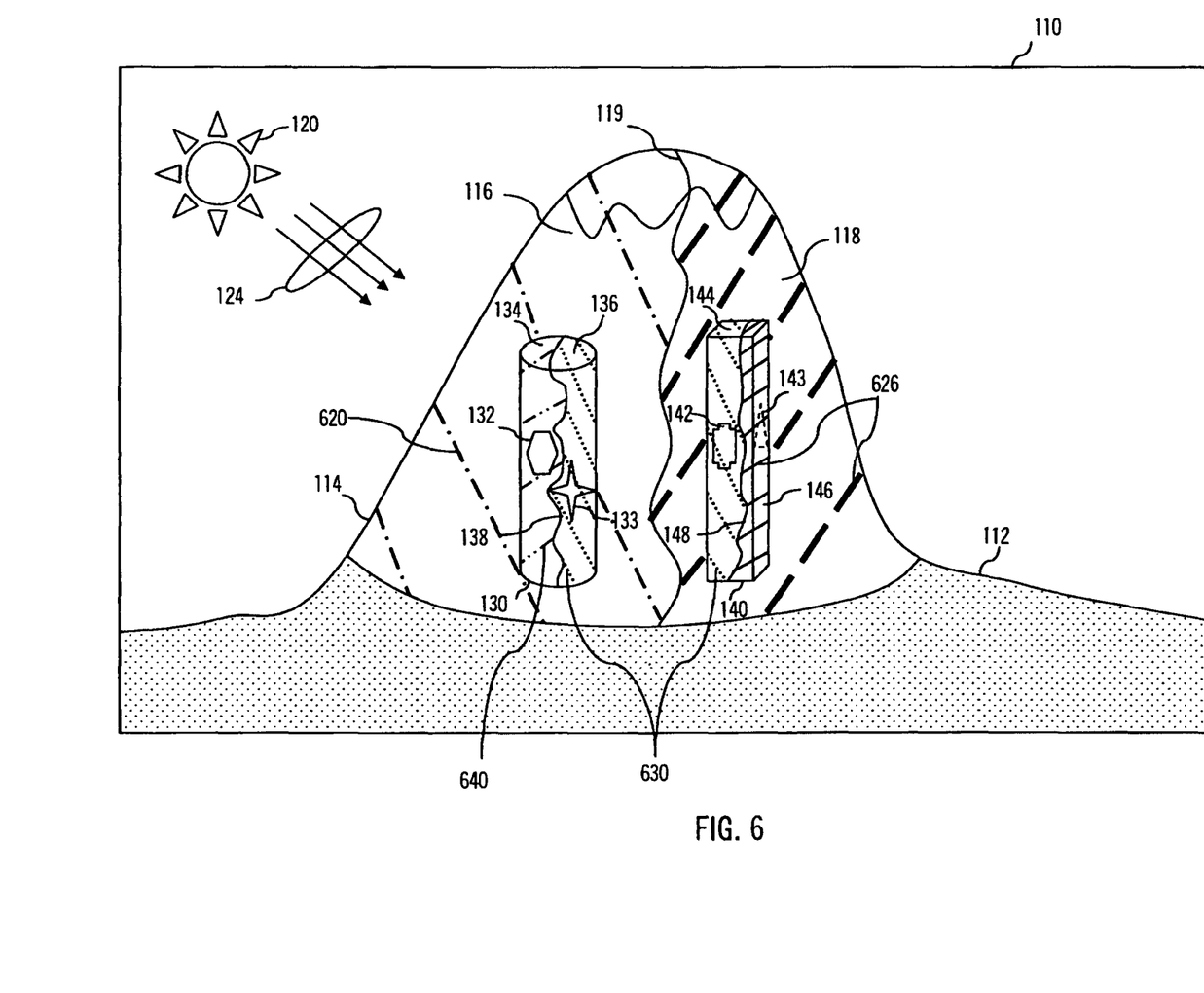
FIG. 6 illustrates the animated image of FIG. 1 after applying the fog effect method of FIG. 5 showing that the two foreground images are treated differently for applying a fog effect, which is based on a light value (or amount of shade) and also on distance from a viewpoint or camera and which causes shaded areas or portions being treated differently (e.g., more quickly effected by fog) compared to lighted or highlighted areas.

Application of this new fog effect method may become clearer with a working example with reference to the animation of FIGS. 1 and 2. As shown in FIG. 6, the fog effect method 500 shown in FIG. 5 has been applied to this relatively simple computer-generated image 110. As shown, the pixels on two sides 116, 118 of the hill 114, which are assumed to be at the same camera distance or to have the same z value, are rendered differently or with differing fog effects 620, 626. Specifically, the pixels with a higher lighting value on side 116 have a greater contribution from their pixel color than the pixels with at least some shadowing in the side 118 that have a smaller lighting value. In other words, the fog effect has been applied earlier to the pixels of side 118 or to a greater degree as compared to pixels of side 116 even though these pixels have equal z values or distances from the camera.

Likewise, a similar process happens on the two foreground objects 130, 140, which are assumed to have substantially equal z values or viewpoint distances. As shown, the fog effect 626 is applied equally to the pixels in side 146 of column or object 140 as to the hill side 118, and this may cause both of these areas of the image 110 to become fully faded or drawn fully using the fog color. This may be expected in the real world, too, because although the pixels of side 146 are closer to the camera than pixels in side 118, these pixels of side 146 have a smaller lighting value. As a result, the detail 143 may be hidden or fade out of view in image 110. Note, however, the pixels of side 144 receive a differing fog effect 630 (or the contribution of the pixel color is greater than that of pixels in side 146) because their lighting values were greater than those of pixels in side 146. Hence, detail 142 may remain visible longer than detail 143 even though these are equally spaced apart from the camera. This same fog effect 630 may be produced in the pixels of side 136 of column/object 130 as these pixels may have a similar lighting value and are similarly spaced from the camera such that detail 133 is faded in a manner that is similar to the fading of detail 142. Further, the pixels of side 134 may have a fog effect or fading 640 applied that is less (or allows a greater contribution of the pixel color) than on side 136 such that detail 132 remains clear longer than detail 133, which provides a more desirable artistic effect than prior fog effect techniques.

Figure 7:
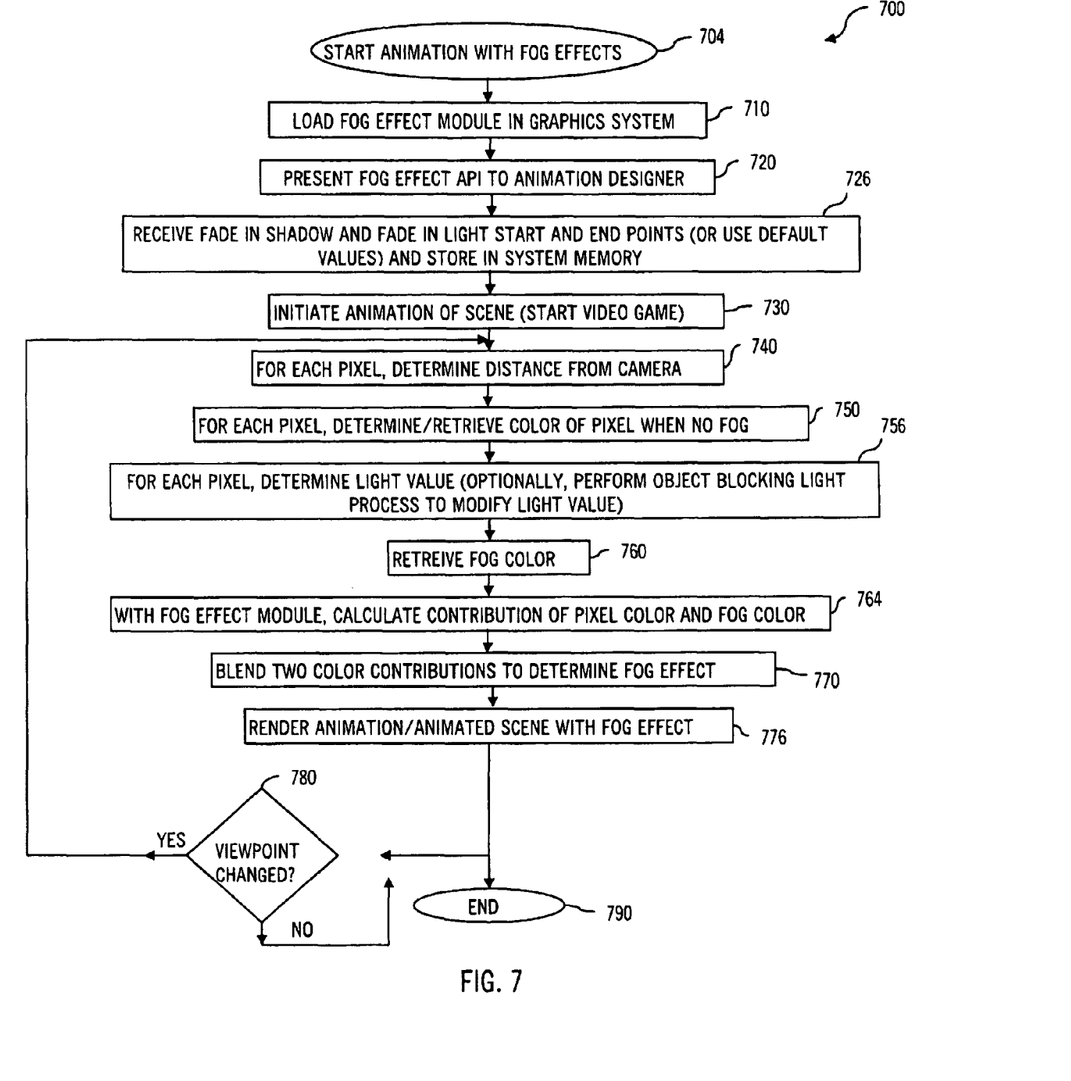
FIG. 7 illustrates a flow chart showing exemplary steps of an animation method including fog effects in accordance with embodiments provided in this description.

FIG. 7 illustrates a method 700 for animating with a fog effect as described herein, and the method 700 may be performed using a graphics system or other computer system. At 704, the method 700 starts such as by providing a fog effect module in software or hardware form that functions as described above to apply fog first to areas with less than maximum lighting values (e.g., shadow-first fog effects). This may include defining default values such as blending range lengths (e.g., distance between fade in start points and end points) and may include defining a mix contribution method to be used to determine color contributions and to blend the two color contributions (e.g., is fog effect determined using linear, exponential, exponential-squared, fog tables, or other techniques). At 710, the method 700 continues with loading a fog effect module or software application into a graphics system 710 such as for use by a CPU, a GPU, or the like in applying the fog effect method described herein. At 720, a fog effect interface may be generated and presented to an animation, video game, or other designer/user such as on a computer system, workstation, or other monitor/display. At 726, the user may input fade in shadow and fade in light start points (or distances) and end points (or distances) (note, the end points may be calculated based on start points), and, if not received, default values that may be displayed at 720 may be used. Step 726 may also include storing these values in system memory or other data storage.

At 730, animation or computer generation of an image is initiated using the fog effect module and its defined parameters including those the defined fade in start points and how blending is performed. In practice, the image generation may occur during play of a video game in a game system or similar applications. At 740, the method 700 includes determining a distance from the camera or z value for each pixel in a scene that is to be animated. At 750, for each pixel, the color of the pixel when no fog is present/applied is determined or retrieved from memory. At 756, the method 700 includes determining a lighting value for each pixel. Lighting values are typically determined by graphics systems during animation or image generation, and these values may be retrieved and used for applying the fog effect (e.g., a separate light determination module or routine may not be required to practice the method 700).

In some cases, the lighting value may be modified to account for one or more objects that may be at least partially blocking light from a source (or casting a shadow upon a pixel). This process may include determining for a pixel a lighting value for the pixel based on its position/location relative to a light source (e.g., is the pixel normal to the light source and if not, what degree from normal is the pixel that causes a reduction in its lighting value). Then the object-blocking process may further include determining whether any object in the scene blocks the pixel's light or is between the light source and the pixel. If not, the previously determined lighting value may be used in the fog effect calculation. If there is one or more object, a second lighting value accounting for the object is determined in 756, and, typically, the second lighting value would be between less than the maximum value (although this is possible if the blocking object is transparent such as a window) such as in the range of 0 to 0.9 on a scale of 0 to 1.0 depending on a light blocking characteristic of the object. The first and second values may be combined (such as by taking the minimum of the two values) to provide a new or modified lighting value (e.g., if lighting value is 1.0 without blockage and 0.8 with blockage the modified value would be 0.8 whereas if the non-blocked value is 0.5 and with blockage value is 0.8 the new value would be the same as the original value of 0.5 and so on). Briefly, step 756 determines how much in light the pixel is and provides a lighting value for each pixel within a predefined lighting value range (such as, but not limited to, 0 to 1 or the like).

At 760, the method 700 includes retrieving a fog color set for use in the animation. The fog color may be uniformly set for an image or may be more localized such as when layered fog is used, when localized clouds, fog, smoke, or other atmospheric elements are included in a scene. The fog color often is chosen to be a background color but may be nearly any color chosen by an artist including gray, white, blue, black, and so on. At 764, with a fog effect module run by a processor, the contributions of the pixel color and fog color are determined. As discussed above with reference to FIGS. 5 and 6, this typically will involve using the lighting value to determine where the distance or z value falls within a fog/pixel color range (where the pixel's distance from the camera falls between a fade in start and end point, which will vary based on lighting value). For example, if a linear contribution is used and the lighting value is 0.5 then step 764 will involve determining where the distance from camera falls between the lighting value 0.5 fade in start and the fade in end points. It may fall nearer the fade in start point (such as 25 percent across the range) such that the contribution of the pixel color is chosen to be 75 percent and the fog color is 25 percent.

In step 770, the method 700 continues with blending the two color contributions to determine the fog effect. Again, this may depend upon the particular fog effect utilized and other parameters may be used to determine how to blend the pixel and fog colors. At step 776, the method 700 includes rendering the image or animated scene (or computer graphics) utilizing the fog effect pixel colors. At 790, the method 700 may end or the method 700 may continue at 780 such as when the viewpoint/camera is moved such as when a player moves a character. The method 700 would then continue at 740 to determine at the present or current location of the camera/viewpoint the distance from the camera for each pixel and then repeating steps 750-776.

Figure 8:
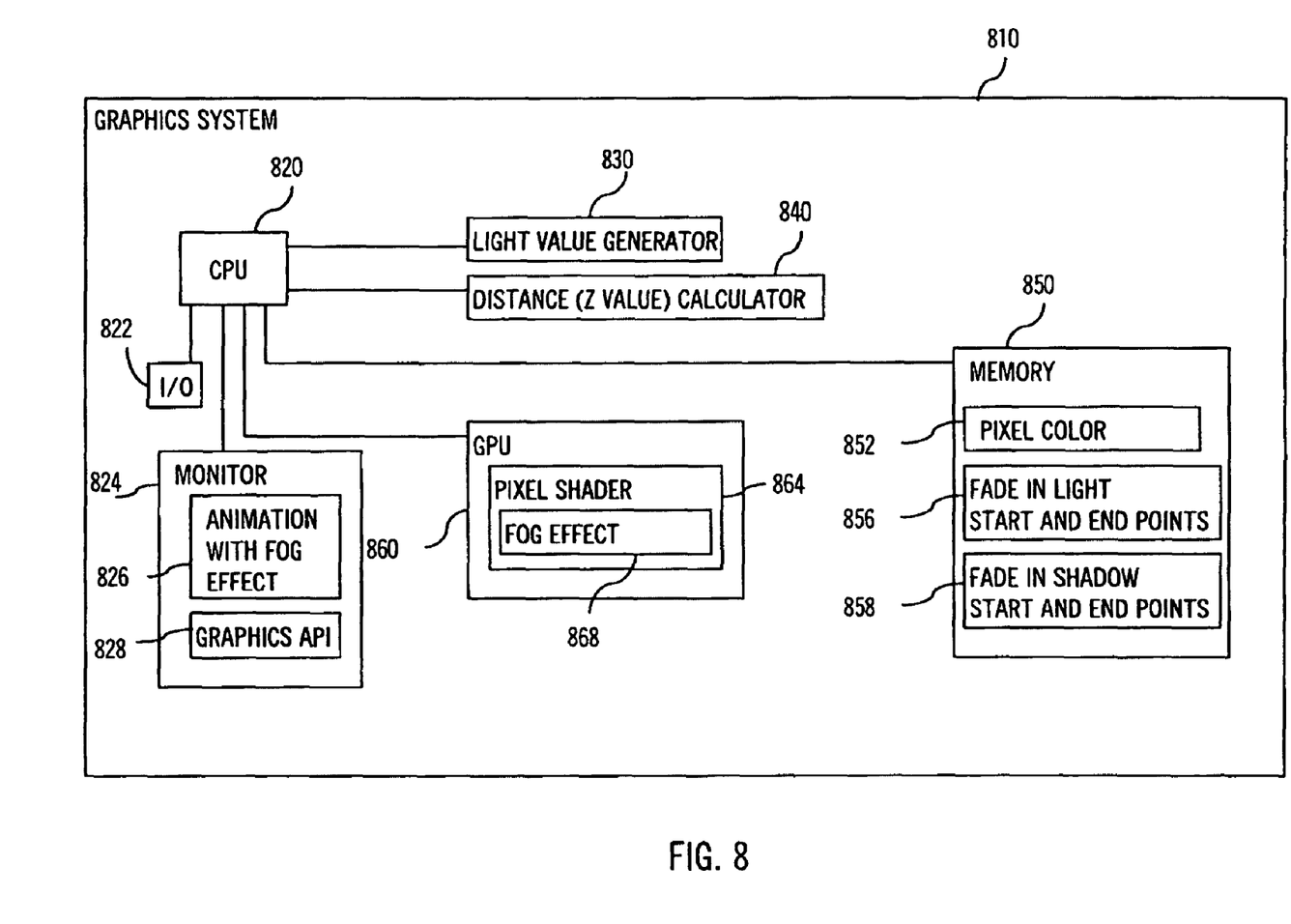
FIG. 8 shows in functional block form a graphics system that may be used in a computer, a video game system, or other electronic device to generate animation with fog effects according to described embodiments.

FIG. 8 illustrates a graphics system 810 that may be used to implement and/or provide the fog effect method described herein. For example, the graphics system 810 may be provided as or part of an artist's workstation, a gamer's computer system, a video game system, and so on. As shown, the system 810 includes a processor 820 that manages operation of input/output (I/O) devices 822 such as a keyboard, a touchscreen, a mouse, and so on that allow a user to enter information into the system 810 such as to set fade in start and end point values, to set pixel colors, to select fog colors, to choose blending techniques, and so on. The CPU 820 also controls operation of a monitor 824 that may be used to assist the operator or user of system 810 in entering input or image-generation information such as via a graphics API or the like 828 that may be used to display present fog effect parameters and the like. The monitor 824 may also be used to display a scene as it is being created by an animator or artist (such as with computer animation software not shown in FIG. 8) and/or to display the rendered scene or animation 826 showing the fog effect described herein.

The CPU 820 may also be used to run software/hardware to provide a light value generator 830 that functions to determine or provide lighting values for each pixel in a built scene (or via triangle information for the scene's objects that provide vertex information including lighting values). The CPU 820 may also run software/hardware to provide a distance (or z value) calculator or mechanism 840 that performs during operation of system 810 to determine for each pixel a distance from a camera or an eye-coordinate at a particular point in time. The system 850 may include or have access to memory 850 that is used to, at least temporarily, store pixel color data 852, which may be set by the user of system 810 via I/O 822 and/or API 828. The memory 850 may also be used to store fog effect method parameters including fade in light start and end points (e.g., for pixels with lighting values at a maximum value) 856 and fade in shadow start and end points (e.g., for pixels with minimum lighting values) 858.

The system 810 further includes a GPU 860 that is used to render the image 826, and, to this end, the GPU 860 may include a pixel shader 864 that uses the fog effect module 868 to provide fog or to determine a fog effect for each pixel. To this end, as discussed above, the fog effect module 868 may be fed as input the pixel color data 852, the fade in start and end points 856, 858, the lighting values from generator 830, and the distances from the camera for each pixel from distance calculator 840. The fog effect generator 868 may then function to determine for a pixel with a particular lighting value where its distance falls between the fade in start and end points associated with that particular lighting value, and from this determination, a contribution of the pixel color and the fog color is determined. This contribution may then be used by the fog effect module 868 (or pixel shader 864) in determining a final (or fog-effected) color for each pixel. The blended or fog-effected color is then used by the GPU 860 in rendering the animated image with the fog effect that may be displayed on the monitor 824 as shown at 826.

Figure 9:
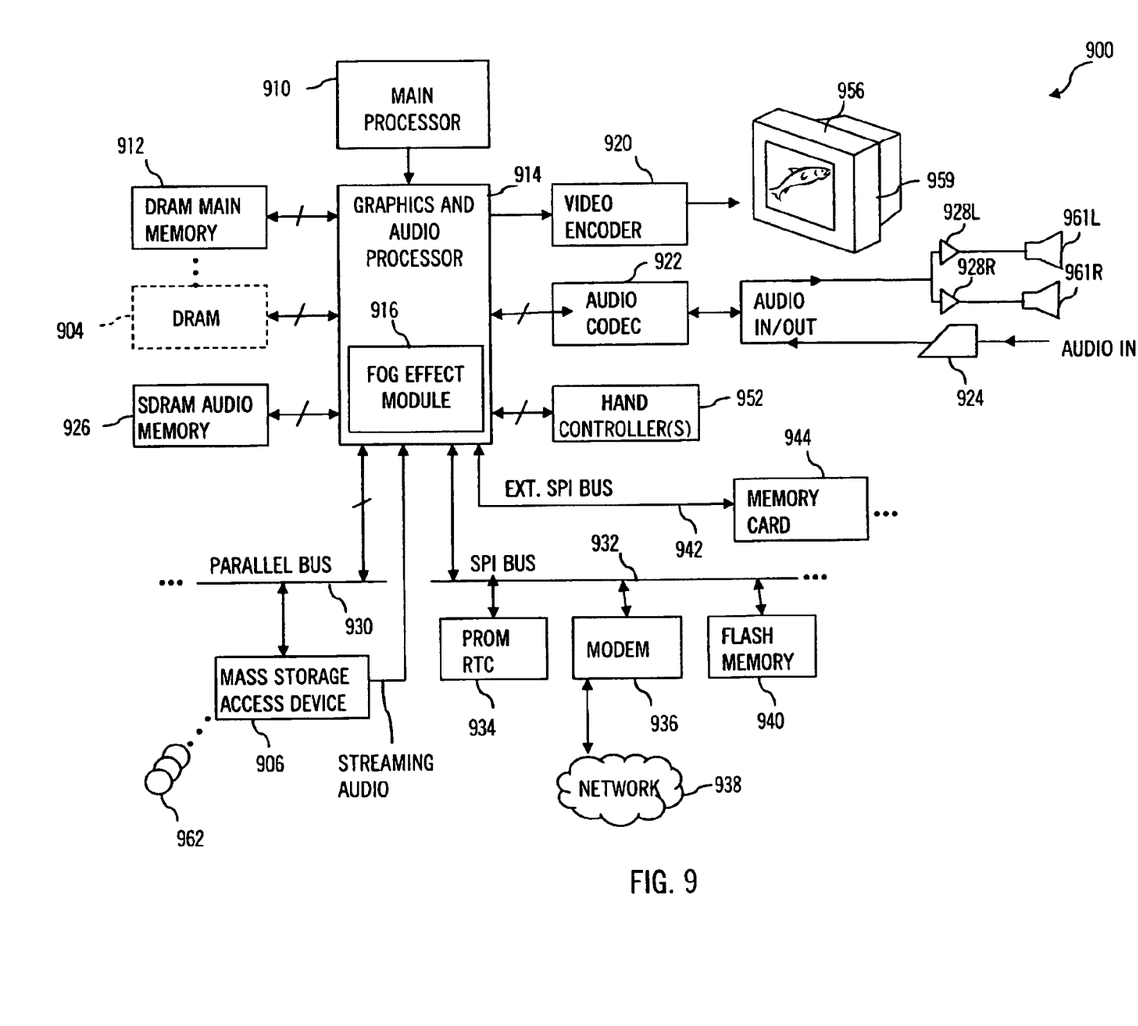
FIG. 9 is a block diagram illustrating exemplary computer architecture for providing a graphics systems as may be used, for example, to implement a video game systems or the like with a fog effect as described herein.

FIG. 9 shows a block diagram of example components of system 900 that may be used to provide computer animation with the described fog effects. The primary components include: a main processor (CPU) 910, a main memory 912, and a graphics and audio processor 914 that includes a fog effect module 916 configured to perform the fog effect functions described herein (e.g., based on location of a pixel a distance from a camera/viewpoint may be determined and based on a lighting value associated with the pixel, the pixel's distance or z value is used to determine a pixel color contribution and a fog color contribution).

In the system 900, main processor 910 receives inputs from handheld controllers 908 and/or other input devices via graphics and audio processor 914. Main processor 910 interactively responds to user inputs, and executes a video game or other program supplied, for example, by external storage media 962 via a mass storage access device 906 such as an optical disk drive or the like. As one example, in the context of video game play, main processor 910 can perform collision detection and animation processing in addition to a variety of interactive and control functions.

In this example, main processor 910 generates 3D graphics and audio commands and sends them to graphics and audio processor 914. The graphics and audio processor 914 processes these commands to generate visual images or computer animation with fog effects on display 959 and sound on speakers 961R, 961L or other suitable sound-generating devices. Example system 900 includes a video encoder 920 that receives image signals from graphics and audio processor 914 and converts the image signals into analog and/or digital video signals suitable for display on a standard display device such as a computer monitor or home color television set 956.

System 900 also includes an audio codec (compressor/decompressor) 922 that compresses and decompresses digitized audio signals and may also convert between digital and analog audio signaling formats as needed. Audio codec 922 can receive audio inputs via a buffer 924 and provide them to graphics and audio processor 914 for processing (e.g., mixing with other audio signals the processor generates and/or receives via a streaming audio output of mass storage access device 906). Graphics and audio processor 914 may store audio related information in an audio memory 926 that is available for audio tasks. Graphics and audio processor 914 provides the resulting audio output signals to audio codec 922 for decompression and conversion to analog signals (e.g., via buffer amplifiers 928L, 928R) so they can be reproduced by speakers 961L, 961R.

Graphics and audio processor 914 has the ability to communicate with various additional devices that may be present within system 900. For example, a parallel digital bus 930 may be used to communicate with mass storage access device 906 and/or other components. A serial peripheral bus 932 may communicate with a variety of peripheral or other devices including, for example, a programmable read-only memory and/or real time clock 934, a modem 936 or other networking interface (which may in turn connect system 950 to a telecommunications network 938 such as the Internet or other digital network from/to which program instructions and/or data can be downloaded or uploaded), and flash memory 940. A further external serial bus 942 may be used to communicate with additional expansion memory 944 (e.g., a memory card) or other devices. Connectors may be used to connect various devices to busses 930, 932, 942.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. In the above discussion, it should be understood that the particular method or technique for achieving a fog effect, using the differing fade in start and end points that are based on lighting values, are not limiting to the invention and a variety of known techniques may be used to achieve the shadow-first fog effect. For example, a range-based method may be used (with the modifications described herein) with the fog scale or blending value (how much visibility drops off based on where a distance falls between a fade in start point/distance and a fade in end point/distance) may be defined using linear, exponential, exponential-squared or other techniques. For example, the blending methods taught in U.S. Pat. Nos. 6,580,430 and 7,245,301, both of which are incorporated herein by reference, may be used to practice the shadow-first fog effect method.

In other words, an animator or artist may typically specify how fog visibility drops off with distance beginning with a fade in start point/distance (which they may also set such as for minimum and maximum lighting values), and conventional equations such the well-known linear formula, the exponential formula, and/or the exponential squared formula (or others) may be used, and these may be used with or without modification and individually or together (such as using one for pixels with a lighting value over a particular amount (such as greater than 0.5 on a 0 to 1.0 scale use linear drop off) and another for pixels with a lighting value under a particular amount (such as less than 0.5 use exponential or exponential square to cause faster drop off for more shaded or less highlighted pixels and the details they represent).

In another embodiment, a fog effect method is provided that also functions to control rendering of shadowed pixels to assure that these pixels do not appear brighter than pixels with higher lighting values. For example, if a fog color chosen to be light blue, a shadow may be cast by an object on a darker surface such as one that is colored dark red. If no mechanism is provided, the shadowed area may appear "brighter" than nearby but more brightly lit surfaces or pixels because the dark red may seem darker than the light blue. To control this potentially unwanted effect, the fog effect method (or a module implementing a fog effect method) may include comparing out of shadow pixels to in shadow pixels (such as by Max(Out, In)), and, for example, a maximum in each of the red, green, and blue channels may be determined to assure that the out of shadow pixels are rendered brighter than in shadow pixels. The above-described fog effect technique was created in part to try to simulate both artistic and physical effects, but the technique may not actually be how an artist may achieve that effect or how the similar effect happens in the real world. As a result, problems may be encountered like the one regarding light blue and dark red (or other color combinations) as mentioned in this paragraph. Artistically, it is typically undesirable for something in shadow to be brighter than the midtones of something not in shadow, and the modification described in this paragraph may be used to try to address this situation in the above-described fog effect technique(s) while other implementations may utilized other methods to overcome or address this potential problem.

We claim:

1. A method for providing a fog effect during computer animation of an image, comprising:
    with a fog effect module run by a processor of graphics system, determining a lighting value for each pixel of an image to be animated based on a location of each of the pixels relative to a light source;
    with the fog effect module, setting for each of the pixels a fade in start distance measured from a camera location at which to start adding fog, wherein the fade in start distances are each selected based on the determined lighting value associated with a corresponding one of the pixels;
    with the fog effect module, adding fog to the image including starting at the fade in start distances for each of the pixels; and
    with the graphics system, rendering the image using the fog-added pixels.

2. The method of claim 1, wherein the setting of the fade in start distances comprises retrieving from memory a fade in start distance for pixels with a minimum lighting value and a fade in start distance for pixels with a maximum lighting value and then comparing the determined lighting value of each of the pixels to the minimum and maximum lighting values to determine the fade in start distance to be used for each of the pixels.

3. The method of claim 2, wherein the fade in start distance for pixels with a minimum lighting value is less than the fade in start distance for pixels with a maximum lighting value.

4. The method of claim 3, wherein the fade in start distance for pixels with a minimum lighting value is less than about half of the fade in start distance for pixels with a maximum lighting value.

5. The method of claim 2, wherein the determination of the fade in start distance to be used for each of the pixels comprises a linear calculation, whereby a pixel with a lighting value midway between the minimum and maximum lighting values has a fade in start distance set about midway between the fade in start distances associated with the minimum and maximum lighting values, respectively.

6. The method of claim 2, further comprising retrieving a fade in end distance for pixels with the minimum lighting value and a fade in end distance for pixels with the maximum lighting value and setting for each of the pixels a fade in end distance for each of the pixels based on a comparison of the lighting value corresponding to the pixel to the minimum and maximum lighting values.

7. The method of claim 6, wherein the adding of the fog to the image comprises, for each of the pixels, blending a pixel color with a fog color based on a distance from the camera of the pixel relative to the fade in start and end distances set for the pixel based on the pixel lighting value.

8. The method of claim 1, wherein the determining of the lighting value comprises, for each of the pixels, determining a presence of a blocking object between the light source and the location of the pixel and when present, modifying the lighting value based on a lighting value for the pixel in the presence of the blocking object.

9. A computer program product, comprising:
    a non-transitory computer useable medium and computer readable code embodied on the computer useable medium for simulating atmospheric effects in an animated image generated by a graphics system, the computer readable code comprising:
    computer readable program code devices causing a computer to determine, for each of a plurality of pixels of an image, a distance from a camera location;
    computer readable program code devices causing the computer to determine, for each of the pixels, a lighting value defining an amount of lighting of each of the pixels by a light source used to provide light in the image;
    computer readable program code devices causing the computer, for each of the pixels, to blend a contribution of a pixel color and a contribution of a fog color to add fog to the image, wherein the contributions of the pixel color and the fog color are determined based on the lighting values and the camera distances; and
    computer readable program code devices causing the computer to render the image using the blend of the pixel color and the fog color contributions for each of the pixels.

10. The computer program product of claim 9, wherein the contributions of the pixel and fog colors are determined by comparing, for each of the pixels, the camera distance with a fade in start distance measured from the camera location and a fade in end distance measured from the camera location, the fade in start distance defining when the blending begins and the fog color contribution is set to a value greater than zero with increasing distances and the fade in end distance defining when the blending ends and the pixel color contribution is set to zero with increasing distances.

11. The computer program product of claim 10, wherein the fade in start and end distances are set for each of the pixels based on the lighting value determined for the pixel.

12. The computer program product of claim 11, wherein for each of the pixels the fade in start distance is greater than about a fade in start distance defined for pixels with a minimum lighting value and is less than about a fade in start distance defined for pixels with a maximum lighting value.

13. The computer program product of claim 12, wherein the determining of the lighting value comprises determining for each of the pixels whether a shadowing object is blocking the lighting from the light source and when a shadowing object is present, changing the lighting value to a minimum of a lighting value with the shadowing object and without the shadowing object.

14. The computer program product of claim 9, wherein the blending comprises linear, exponential, or exponential squared blending of the contributions and wherein the contributions of the fog color are greater for a particular camera distance for ones of the pixels with smaller ones of the determined lighting values.

15. A graphics system for generating animated images including a fog effect that is provided first in shadowed areas, comprising:
   a memory device storing a plurality of image pixels, a color associated with each of the pixels, and a fog color;
   a processor accessing the memory device and rendering an image; and
   a fog effect component run by the processor that uses a lighting value associated with each of the pixels to define a fade in start distance from a camera location and a fade in end distance from the camera location,
   wherein the fade in start and end distances vary for the pixels such that the pixels with smaller lighting values have smaller fade in start and end distances than the pixels with larger lighting values,
   wherein the fog effect component, for each of the pixels, blends the fog color with the pixel color to add a fog effect, with the contribution of the fog and pixel colors being selected based on a comparison of a camera distance for the pixel with the defined fade in start and end distances, and
   wherein the rendering of the image by the processor is performed using the blended fog and pixel colors for each of the pixels.

16. The system of claim 15, further comprising a user interface displayed to a user including a portion for receiving a first fade in start distance for pixels having a lighting value equal to a minimum value and a second fade in start distance for pixels having a lighting value equal to a maximum value, wherein the second fade in start distance is greater than the first fade in start distance and wherein the fade in start distances for each of the pixels is assigned by the fog effect component based on a comparison to the minimum and maximum values of lighting values.

17. The system of claim 16, further comprising using the user interface to receive a first fade in end distance for pixels with a lighting value equal to the minimum value and a second fade in end distance for pixels with a lighting value equal to the maximum value, wherein the first and second fade in end distances define camera distances for a pixel where the blended fog and pixel colors comprise only the fog color, wherein the first fade in distance is less than the second fade in distance, and wherein the fade in end distances for each of the pixels is assigned by the fog effect component based on a comparison to the minimum and maximum values of lighting values.

18. The system of claim 17, wherein the fog effect component, for each of the pixels, modifies the lighting value when a blocking object is determined to be positioned between a light source and the pixel.

19. The system of claim 15, wherein a first set of the pixels have lighting values that are equal to a minimum lighting value and a second set of the pixels have lighting values that are equal to a maximum lighting value and wherein the blending is performed with increasing distances of the pixels from the camera location such that the first set of the pixels is rendered with the blend of fog and pixels colors including a nonzero percentage of the fog color before the second set of the pixels is rendered using a nonzero percentage of the fog color.

20. The system of claim 15, wherein for each of the pixels the fade in start distance and the fade in end distance define a fade out range for the pixel and wherein the fade out range length increases with a magnitude of the lighting value.

* * * * *